United States Patent
Sans Perarnau et al.

(10) Patent No.: US 11,596,192 B2
(45) Date of Patent: Mar. 7, 2023

(54) MANNEQUIN FOR THE SURFACE TREATMENT OF PANTS

(71) Applicant: JEANOLOGIA, S. L., Valencia (ES)

(72) Inventors: Albert Sans Perarnau, Barcelona (ES); Ivan VilaróVila, Barcelona (ES)

(73) Assignee: JEANOLOGIA, S. L., Paterna (ES)

( * ) Notice: Subject to any disclaimer, the term of this patent is extended or adjusted under 35 U.S.C. 154(b) by 1161 days.

(21) Appl. No.: 16/098,549

(22) PCT Filed: May 2, 2017

(86) PCT No.: PCT/ES2017/070270
§ 371 (c)(1),
(2) Date: Nov. 2, 2018

(87) PCT Pub. No.: WO2017/191347
PCT Pub. Date: Nov. 9, 2017

(65) Prior Publication Data
US 2019/0142092 A1 May 16, 2019

(30) Foreign Application Priority Data
May 3, 2016 (ES) ................................ ES201630571

(51) Int. Cl.
*A41H 5/02* (2006.01)
*D06C 5/00* (2006.01)
(Continued)

(52) U.S. Cl.
CPC ............ *A41H 5/02* (2013.01); *B23K 26/352* (2015.10); *D06B 11/0073* (2013.01);
(Continued)

(58) Field of Classification Search
CPC ... A41H 5/00; A41H 5/02; D06C 5/00; D06C 5/005
USPC ................................................. 223/67, 72–77
See application file for complete search history.

(56) References Cited

U.S. PATENT DOCUMENTS 3,550,820 A * 12/1970 O'Boyle ............... D06F 71/295
223/73
3,556,361 A * 1/1971 O'Boyle ............... D06F 71/295
223/73
(Continued)

FOREIGN PATENT DOCUMENTS

CN     201258424 Y     6/2009
EP       0417659 A1    3/1991
(Continued)

OTHER PUBLICATIONS

Search Report dated Aug. 16, 2017 in corresponding International Application No. PCT/ES2017/070270; 5 pgs.

*Primary Examiner* — Nathan E Durham
(74) *Attorney, Agent, or Firm* — Maier & Maier, PLLC

(57) ABSTRACT

Mannequin for the surface treatment of pants. Mannequin for the surface treatment of pants, comprising an upper support structure from which two legs extend, wherein each of said legs has an inflatable balloon arranged at its rear part. Each of said inflatable balloons has its outer lateral section folded upon itself at least once around a folding line extending from the upper edge to the lower edge of the balloon. The upper edge is fixed to the rear upper end of the corresponding leg and the lower edge is fixed to a rear intermediate point of the corresponding leg, such that the parts of the edges corresponding to the outer lateral section are also fixed to the leg of the mannequin.

30 Claims, 17 Drawing Sheets

(51) Int. Cl.
*D06B 11/00* (2006.01)
*D06C 23/02* (2006.01)
*B23K 26/352* (2014.01)
*D06M 10/00* (2006.01)

(52) U.S. Cl.
CPC .......... *D06B 11/0096* (2013.01); *D06C 5/005* (2013.01); *D06C 23/02* (2013.01); *D06M 10/005* (2013.01); *D10B 2501/04* (2013.01)

(56) References Cited

U.S. PATENT DOCUMENTS

| | | | |
|---|---|---|---|
| 4,845,790 A | | 7/1989 | Brasington |
| 5,458,265 A | * | 10/1995 | Hester .................... D06C 5/005 |
| | | | 198/465.1 |
| 8,118,200 B2 | * | 2/2012 | Hickle .................... D06F 71/28 |
| | | | 223/74 |
| 8,122,575 B2 | * | 2/2012 | Kang ..................... D06C 23/04 |
| | | | 223/67 |
| 2003/0000929 A1 | | 1/2003 | Bowker et al. |
| 2003/0146194 A1 | | 8/2003 | Bowker et al. |

FOREIGN PATENT DOCUMENTS

| | | |
|---|---|---|
| EP | 1433886 A2 | 6/2004 |
| EP | 1 650 337 A1 | 4/2006 |
| WO | 03/029545 A1 | 4/2003 |
| WO | 2006/095248 A1 | 9/2006 |
| WO | 2014/120105 A1 | 8/2014 |

\* cited by examiner

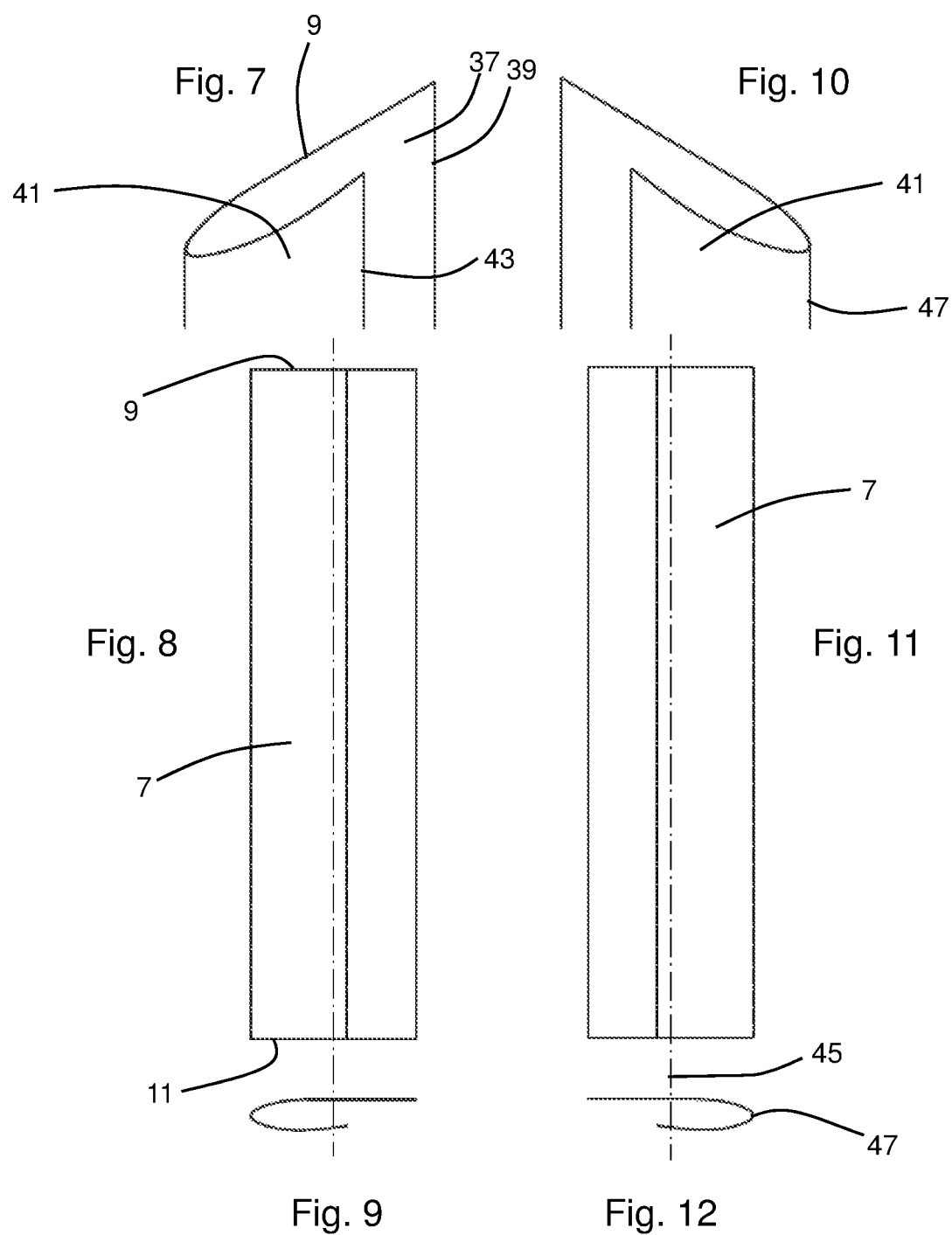

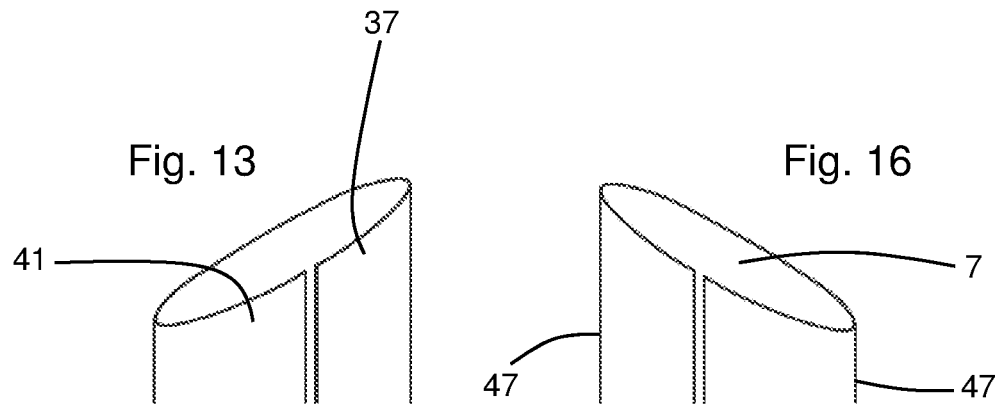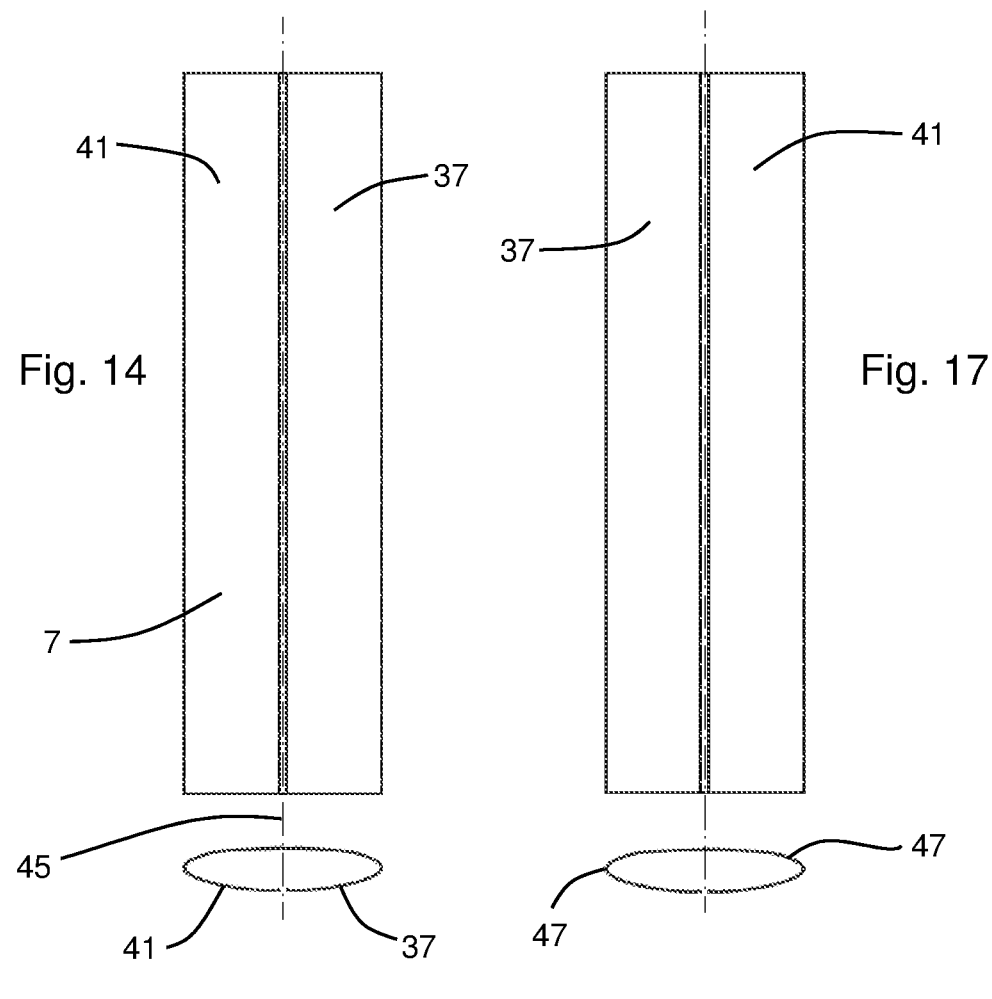

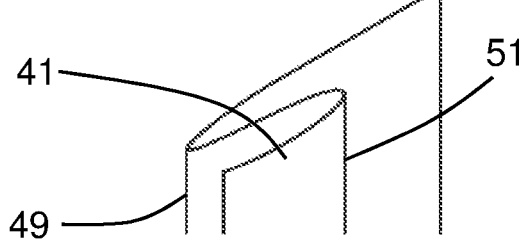
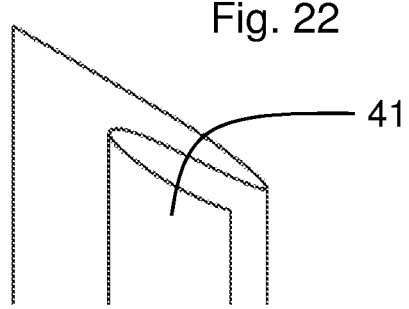
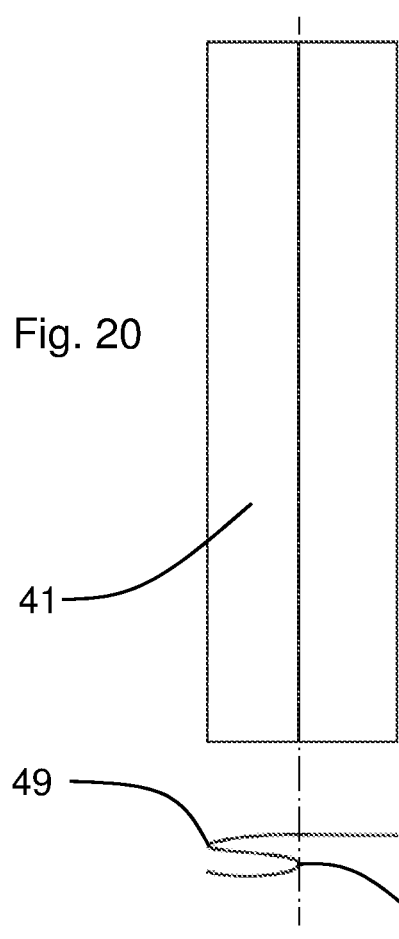
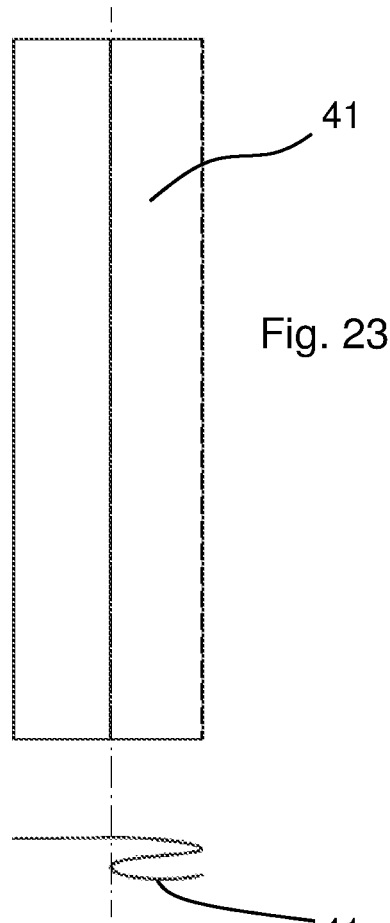

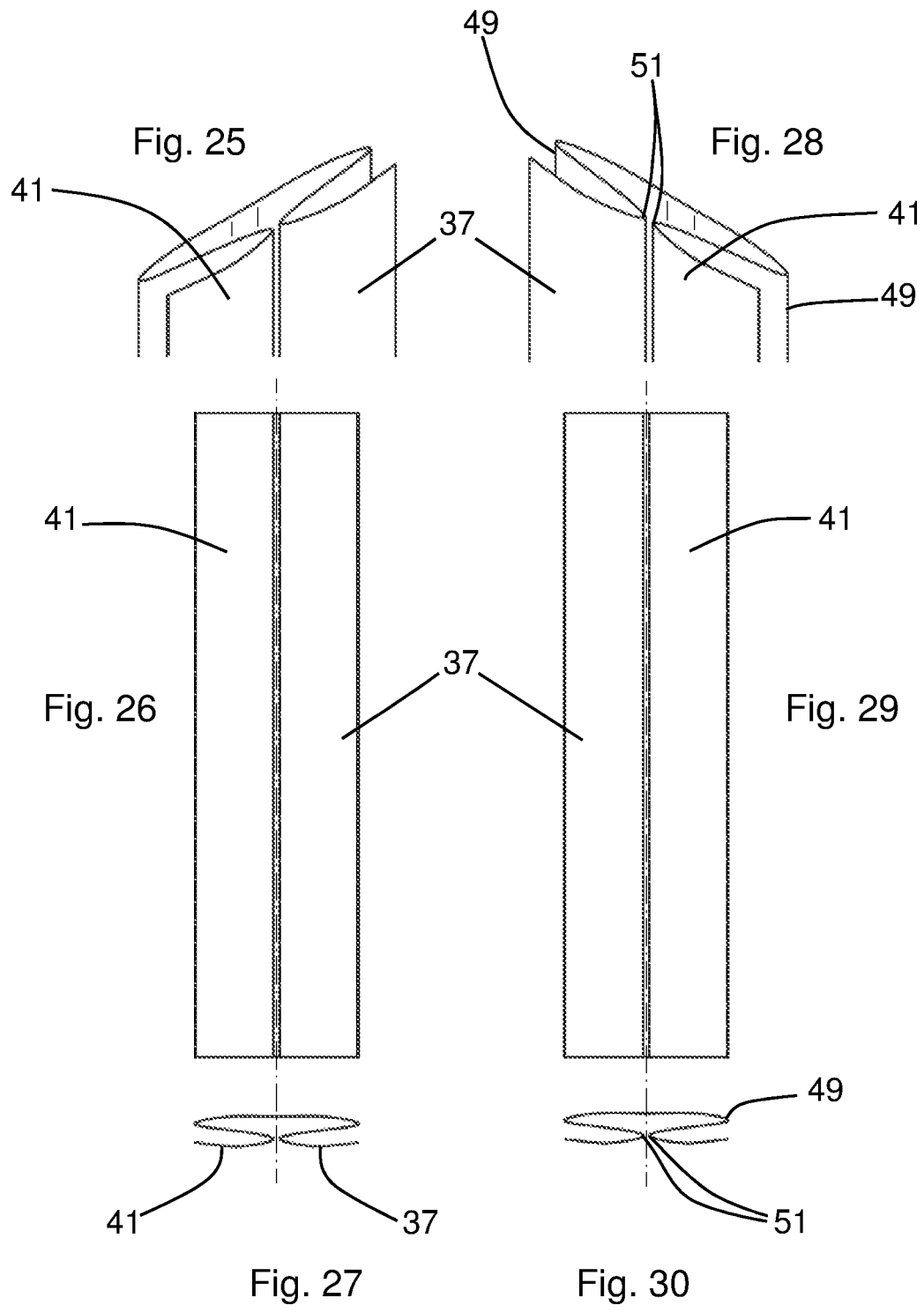

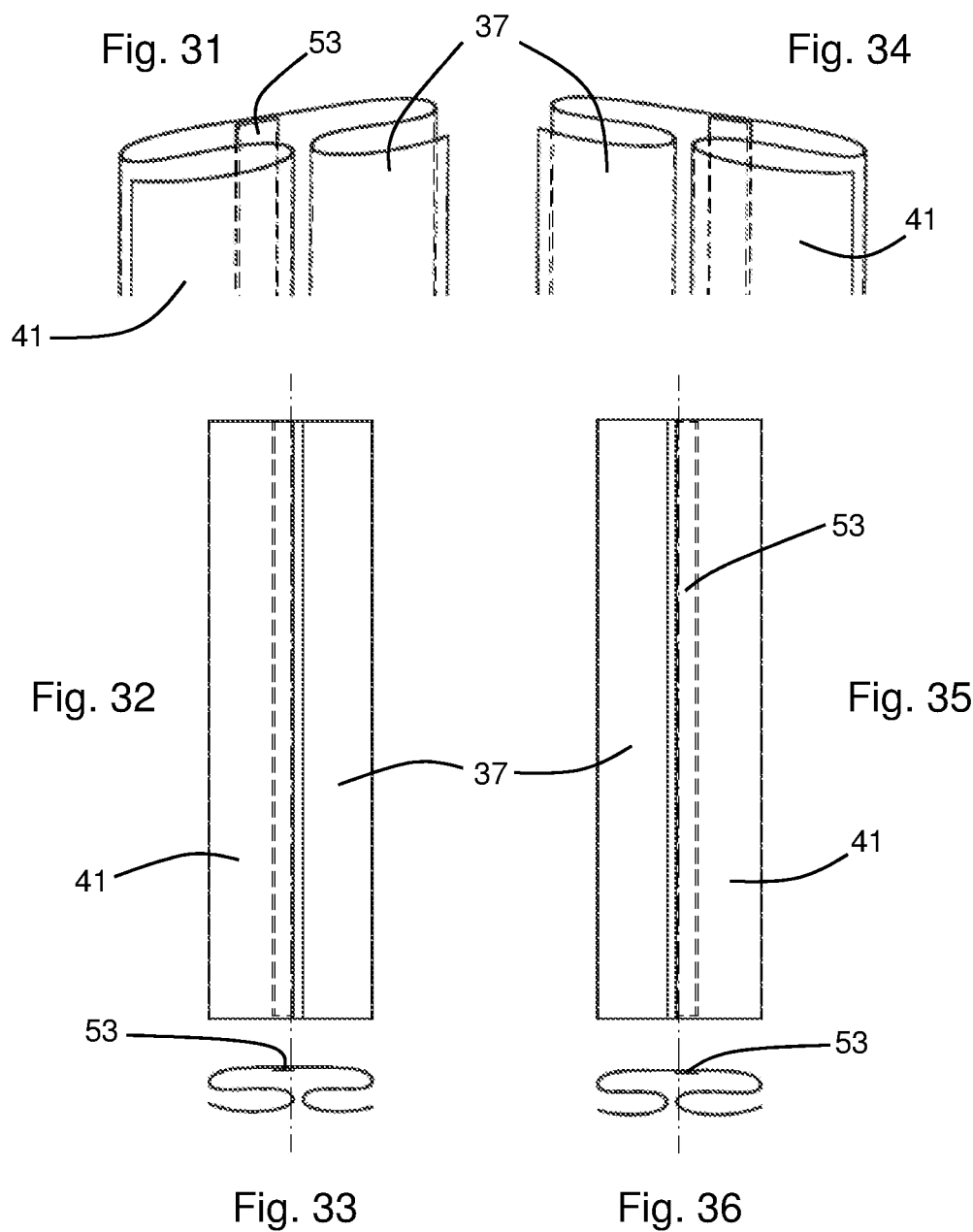

MANNEQUIN FOR THE SURFACE TREATMENT OF PANTS

FIELD

This invention relates to a mannequin for the surface treatment of pants, comprising an upper support structure, with a fixing area for the upper part of a pair of pants, and from which two legs, suitable for being housed in the interior of the pant legs to be treated, extend. Each leg defines a longitudinal axis. The mannequin has a front part, corresponding to the front part of the pants, and a rear part, where each of the legs has an inflatable balloon arranged at its rear part. The inflatable balloon has an upper edge, a lower edge, an inner lateral section with an inner edge, proximal to the other leg, and an outer lateral section with an outer edge, opposite the inner lateral section. The inflatable balloon has a longitudinal axis passing through its geometric center and that is parallel to the longitudinal axis of the corresponding leg.

BACKGROUND

Mannequins such as those indicated above are known. One of its applications is for the surface treatment of the pants by laser. Examples thereof can be found in patent applications US 2003/0146194 A1 and WO 2014/120105 A1.

However, laser treatment is very sensitive to differences in distance between the focus of the laser light beam and the surface to be treated. In addition, it requires the surface to be treated to be devoid of folds. Furthermore, the high temperatures reached during the treatment can negatively affect the life span of the balloon.

On the other hand, there is always an interest in increasing the productivity of the laser treatment process.

SUMMARY

The object of the invention is to overcome these drawbacks. This purpose is achieved by means of a mannequin of the type indicated at the beginning characterized in that:
each of the inflatable balloons has its outer lateral section folded upon itself at least once around a folding line extending from the upper edge to the lower edge,
the upper edge is fixed to the rear upper end of the corresponding leg, such that the upper edge part corresponding to the outer lateral section is also fixed to the rear upper end of the leg,
the lower edge is fixed to a rear intermediate point of the corresponding leg, such that the lower edge part corresponding to the outer lateral section is also fixed to the rear intermediate point.

Indeed, the inclusion of a balloon with a fold as indicated on the balloon offers a number of advantages:
- the balloon, when swelling, fills the rear part of the pants, allowing the front part to be flatter. It should be noted that most laser treatments are usually done on the front part of the pants.
- the folding causes the balloon to swell preferably in a lateral direction (widthwise) and preferably outwards and less in thickness, which also improves the final shape adopted by the pants. In the present description and claims the expression "thickness" has been used to refer to the third dimension of the balloon (perpendicular to the length, measured in the direction of the longitudinal axis, and to the width). Thickness of the balloon is, therefore, the size of the balloon as such (swollen or not) measured "from front to back". It should not be confused with the thickness of the sheet of elastomeric material forming the balloon.
- the balloon, being fixed by both its upper edge and its lower edge, does not swell longitudinally either.
- the balloon swells more "outwards" (away from the leg surface) than "inwards" (i.e. towards the leg). In fact, since the balloon is mounted in contact with the surface of the rear part of the leg, when swelling towards the rear part, and since the leg itself prevents the displacement of the balloon towards the back, the consequence is that the balloon moves outwards but in a forced way that interests to minimize.
- the balloon swells with a lower air pressure, which makes it easier for the balloon to adopt the form of the pants and not the other way around. In addition, the filling and emptying cycles of the balloon are faster due to the fact that a smaller amount of air needs to be introduced or removed.
- the balloon being only in the upper rear part of the pants, the surface prone to damage by the laser is significantly diminished, so that the life span of the balloon is greater.

Preferably each of the inflatable balloons has its outer lateral section folded upon itself at least twice around an inner folding line and an outer folding line both extending from the upper edge to the lower edge, so that the outer lateral section is folded in a zigzag fashion,
the upper edge is fixed to the rear upper end of the corresponding leg, such that the upper edge part corresponding to the outer lateral section is also fixed to the rear upper end of the leg,
the lower edge is fixed to a rear intermediate point of the corresponding leg, such that the lower edge part corresponding to the outer lateral section is also fixed to the rear intermediate point.

This alternative, with zigzag folding, significantly improves the balloon's behavior when swollen so that the aforementioned advantages are increased. The increase of folds:
- increases the effect of lateral swelling over depth swelling, the effect of swelling "outwards" instead of "inwards" and the need for a lower filling pressure.

By indicating that the lower edge is fixed to a rear intermediate point of the leg what is meant is that it is not fixed to the lower end of the leg, so that the balloon is offset upwardly from the leg. In other words, the center (in the longitudinal direction) of the balloon is above the center (in the longitudinal direction) of the leg. Advantageously the intermediate point is arranged within a range of 25% to 75% of the total length of the corresponding leg and, preferably, said intermediate point is arranged within a range of 30% to 50% of the total length of the corresponding leg, measured from the upper end of the leg. It is of interest to have the balloon swelling effect on the upper rear part of the pants. The lower part of the pants, preferably from just above the knees and downwards no longer needs to be subjected to this effect of the swelling of the balloon, and may even be better not to be subjected to the effect of swelling of the balloon, since, in this way, the lower part of the pants can be completely flat, both at the front part and at the rear part. It is therefore of interest that the lower edge of the balloon is not fixed at the lower end of the leg but rather at an intermediate point thereof, which is preferably in the aforementioned ranges. On the other hand, by making the balloon shorter and, therefore, with a smaller volume, faster air filling and emptying cycles can be achieved. The choice of the particular point may have to be a compromise solution, for example if the mannequin is to be used to treat pants of various sizes. In this regard, it may be advantageous for the mannequin to have a plurality of intermediate points so that a balloon can be substituted by another of different length depending on the size of the pants to be treated.

Preferably each of the inflatable balloons has its inner lateral section folded upon itself at least once around a folding line extending from the upper edge to the lower edge, the upper edge is fixed to the rear upper end of the corresponding leg, such that the upper edge part corresponding to the inner lateral section is also fixed to the rear upper end of the leg, and the lower edge is fixed to a rear intermediate point of the corresponding leg, such that the lower edge part corresponding to the inner lateral section is also fixed to the rear intermediate point. That is, the balloon has the two lateral sections (the inner and the outer) folded. This improves the filling of the inner part of the pants. Advantageously, each of the inflatable balloons has its inner lateral section folded upon itself at least twice around an inner folding line and an outer folding line both extending from the upper edge to the lower edge, so that the inner lateral section is folded in zigzag fashion, the upper edge is fixed to the rear upper end of the corresponding leg, such that the upper edge part corresponding to the inner lateral section is also fixed to the rear upper end of the leg, and the lower edge is fixed to a rear intermediate point of the corresponding leg, such that the lower edge part corresponding to the inner lateral section is also fixed to the rear intermediate point.

While it is advantageous that the balloon has both its outer lateral section and its inner lateral section folded, so that both sides of the pants are better filled, the fact is that the outer side must be filled and deployed before the inner side, reducing friction to get the balloon to fit the pants and not the other way around. In this regard, it is advantageous (both in the case that the balloon only has the outer lateral section folded or both lateral sections folded) that the inner folding line and the outer folding line of the outer lateral section are arranged in such a way that the folded outer lateral section covers the longitudinal axis of the balloon. In this way, the deformation of the balloon is increased outwards as it is swollen.

The balloon preferably has a sealing section extending from said upper edge to said lower edge. The balloon can have different geometries and be produced in different ways. Thus, for example, it may be formed from a cylindrical tube with its upper and lower edges sealed. Advantageously the upper edge is longer than the lower edge, which can be achieved, for example, from a truncated cone-shaped tube with its top and bottom edges sealed. However, it is advantageous to form the balloon from a flat sheet folded upon itself so that, asides from having the top and bottom edges sealed, it also has a sealing section extending from the upper edge to the lower edge. The presence of this sealing section "stiffens" in a way the central part of the balloon, increasing its tendency to expand more towards the sides than in the direction of its thickness. Preferably, the sealing section extends along the longitudinal axis of the balloon as so this "stiffening" behavior against an expansion in the thickness direction is optimized.

When the balloon has at least two folds and a sealing section, it is advantageous that the inner folding line and the outer folding line of the outer lateral section are arranged such that the folded outer lateral section covers the sealing section. This configuration improves the expansion of the balloon outwards.

Preferably, each of the balloons is fixed to the corresponding leg in a state of longitudinal pre-tension. This provides several advantages, such as having a higher emptying speed and having a smaller expansion in the thickness direction. This pre-tension advantageously implies that the balloon, fixed on the leg, has a length that is increased by 10% to 40% about the length of the balloon at rest (i.e. without being subjected to any stress).

Advantageously, each of the balloons, folded and deflated, has a width equal to or less than the width of the leg section on which it is mounted, so that the balloon does not protrude laterally with respect to the leg on which it is mounted. Another advantage of the mannequin according to the invention is that it allows for a faster duty cycle and requires less labor, since the extraction of the mannequin's pants once treated is performed automatically, without the need for an operator to remove the pants manually. The mannequin is used in an upright position and, after finishing the treatment of the pants, it should fall simply thanks to the force of gravity. Accordingly, it is necessary to reduce as much as possible any friction or rubbing with the mannequin. In this sense, the fact that the deflated balloon does not protrude laterally from the mannequin's legs reduces friction between the balloon and the pants.

Preferably each leg comprises a flat front face and a flat rear face and a hollow space therebetween in which an outer rod and an inner rod are housed, wherein the lower ends of said outer rod and said inner rod are united to a deploying mechanism. In general, state-of-the-art mannequins have two working positions, one called "closed", in which the mannequin has relatively close legs and each leg has two rods (an outer rod and an inner rod) next to the body of the leg that are proximate to the corresponding leg. In this closed position you can easily install or remove a mannequin's pants. In the other working position, called "open", the legs are opened (separating their lower ends) and the outer rod and inner rod expand towards the sides, thanks to the deploying mechanism, so that both rods tighten the legs of the pants in the direction of their width. The treatment of the pants is carried out in this open position. In the mannequin according to the present invention each leg has a flat front face and a flat rear face (instead of being a cone-shaped leg). This allows a smoother surface to be treated by laser treatment. On the other hand, the presence of the hollow space within which the rods are housed avoids friction between the rods and the pants when the mannequin is in the closed position, facilitating their automatic extraction (by gravity) of the pants.

Advantageously the deploying mechanism comprises: [a] a movable guide, [b] two deploying arms, each having one end hingedly attached to the movable guide and a free end, [c] a support, wherein the support is arranged below the movable guide and the movable guide is suitable to move between an unfolding position, wherein the guide is closest to the support, and a folding position, wherein the guide is further away from the support, [d] two rods, each with one end hingedly connected to an intermediate point of the corresponding deploying arm and the other end attached to the support, wherein, in both the folded and unfolded position, the free end of each deploying arm is below the end attached to the movable guide, so that, when deployed, both deploying arms have an inverted V-shape. This geometry makes it possible to employ the mannequin for long-length pants by having more free rod length, while also reducing possible friction between the pants and the mannequin when in the closed position, thus facilitating automatic extraction (by gravity) of the pants.

Since with the alternative described above the rods are not in contact with the pants when the mannequin is in the closed position, a toothed surface, a grooving or any other similar surface finish can be added to the rods (which may be made on the rod or, for example, on a tube which is inserted on the rod) that prevents the pants from sliding upwards. Indeed, the mannequin is usually used to treat pants of various sizes (or even short pants, such as the so-called "shorts"). In the case of short-legged pants, there is a risk that the rods, when the mannequin is in the open position, tend to push the legs upwards, causing wrinkles. The inclusion of this toothed surface (which will only encounter the pants when the mannequin is in the open position) and the mechanism of opening of the rods (which causes them, with the help of the "tooth", to move the pants in the direction of tensioning, moving it slightly downwards) make it possible to solve this problem.

On the other hand, it is also advantageous that the upper support structure, which comprises a waist support area of the pants, has a toothed surface in the support area that prevents the pants from sliding downwards.

Preferably, the mannequin comprises a pant crotch adjustment system which, in turn, comprises: [a] a height adjustment bar, [b] a cross guide having two longitudinal through holes, each housing in its interior one of the inner rods of one of the legs. This geometry also makes the area of the cross of the pants flat according to the position of the height adjustment bar, and avoids having to modify the position of the inner rods when making this adjustment.

Advantageously, each of the legs has a second inflatable balloon arranged in its front part, wherein the second inflatable balloon has an upper edge, a lower edge, an inner lateral section with an inner edge, next to the other leg, and an outer lateral section with an outer edge opposite the inner lateral section where the second inflatable balloon has a longitudinal axis passing through its geometric center and is parallel to the longitudinal axis of the corresponding leg. Indeed, in certain cases (i.e. in the case of large sizes), the presence of inflatable balloons only in the rear part is not sufficient to ensure that there are no wrinkles in the front part. In these cases, the presence of inflatable balloons in the front part allows elimination of wrinkles in the front of the pants.

In general, the second inflatable balloons may incorporate any of the solutions and alternatives provided for the rear balloons, as well as any combination thereof. In particular, it is advantageous for each of the second inflatable balloons to have its outer lateral section folded upon itself at least once around a folding line extending from the upper edge to the lower edge, wherein the upper edge is fixed to the upper front end of the corresponding leg, such that the upper edge portion corresponding to the outer lateral section is also attached to the rear upper end of the leg, and wherein the lower edge is fixed to an front intermediate point of the leg so that the lower edge portion corresponding to the outer lateral section is also attached to the rear intermediate point.

A preferred solution is when each of the second inflatable balloons is equal to the inflatable balloon of the corresponding leg. This solution is particularly advantageous from a logistic, cost and maintenance point of view. However, the opposite solution (different balloons for the front part and the rear part) also has its advantages, since, in fact, the shape of the pants is not symmetrical and the space that must fill the previous balloon is not the same as the space that must fill the rear balloon. Therefore, if the front balloons are different from the rear balloons, you can take advantage of this difference to optimize your design to the specific requirements of the front of the pants. For the same reasons it may be interesting that both the front and rear balloons swell at the same pressure (design simplicity of the mannequin) or that they have different filling pressures. However, and even if the front and rear balloons are the same as each other, the mannequin preferably comprises a pressure generating means for the inflatable balloons and the second balloons suitable for supplying a different swelling pressure between the inflatable balloons and the second balloons.

Preferably the mannequin has a depression generating means connected to the outlet of the balloon outlet valve and/or of the second balloon outlet valve. Indeed, it is interesting to speed up the emptying of the balls. However, the emptying rate decreases as the pressure in the interior decreases (i.e., as the pressure difference between the interior and exterior decreases). In order to accelerate the time the balloon needs to be completely emptied, any means of generating depression (i.e., a pressure below atmospheric pressure) can be used and connected (directly or indirectly) to the outlet valve. The depression generation means may be, for example, a vacuum installation. However, this makes the mannequin expensive and requires a vacuum installation near the place where the mannequin is to be installed. It is therefore advantageous if the generating a depression generating means is a means for generating a venturi effect. Indeed, the means for generating a venturi effect enables a depression to be obtained from an air stream, which can be generated from a pressure generation means. In this way, a depression can be achieved without having to have a conventional vacuum system.

Another optional improvement is when each of the balloons and/or the second balloons has two output valves. In this way it is facilitated the release of air from the balloons.

Preferably each of the legs has a housing in its front part suitable to house the second deflated balloon therein and/or has a housing in its rear part suitable to house the deflated balloon therein. This facilitates the extraction of the pants of the mannequin once treated.

Advantageously, the mannequin comprises a hook arranged at the rear of the fixing area, suitable to rotate between an engaging position, wherein the free end of the hook is arranged below a belt loop of the pants, and a release or disengagement position, wherein the free end of the hook is remote from the belt loop. It is also advantageous if the mannequin comprises a hook arranged in the front part of the fixing area, suitable to rotate between an engaging position, wherein the free end of the hook is arranged below a locking button of the fly of the pants, and a disengagement position, wherein the free end of the hook is remote from the locking button. It further preferably has elastic means adapted to move up the free end of the hook when in the engaging position. This ensures a better positioning of the pants on the mannequin. Advantageously also comprises a lever suitable to move the hook from the engagement position to the disengagement position, thereby automating the disengagement operation.

BRIEF DESCRIPTION OF THE DRAWINGS

Further advantages and features of the invention are appreciated from the following description, in which, without limitation, preferred embodiments of the invention are recited, with reference to the accompanying drawings. The figures show:

FIG. 7 is a schematic perspective cut-away view of a first embodiment of a balloon according to the invention, folded, for the left leg of a mannequin.

FIG. 8, an elevation view of the balloon of FIG. 7.

FIG. 9, a top plan view of the balloon of FIG. 7

FIG. 10 is a view equivalent to those of FIGS. 7 to 9 of the balloon corresponding to the right leg.

FIG. 11 is a view equivalent to those of FIGS. 7 to 9 of the balloon corresponding to the right leg.

FIG. 12 is a view equivalent to those of FIGS. 7 to 9 of the balloon corresponding to the right leg.

FIG. 13 is a view equivalent to FIGS. 7 to 12 of a second embodiment of a balloon according to the invention.

FIG. 14 is a view equivalent to FIGS. 7 to 12 of a second embodiment of a balloon according to the invention.

FIG. 15 is a view equivalent to FIGS. 7 to 12 of a second embodiment of a balloon according to the invention.

FIG. 16 is a view equivalent to FIGS. 7 to 12 of a second embodiment of a balloon according to the invention.

FIG. 17 is a view equivalent to FIGS. 7 to 12 of a second embodiment of a balloon according to the invention.

FIG. 18 is a view equivalent to FIGS. 7 to 12 of a second embodiment of a balloon according to the invention.

FIG. 19 is a view equivalent to FIGS. 7 to 12 of a third embodiment of a balloon according to the invention.

FIG. 20 is a view equivalent to FIGS. 7 to 12 of a third embodiment of a balloon according to the invention.

FIG. 21 is a view equivalent to FIGS. 7 to 12 of a third embodiment of a balloon according to the invention.

FIG. 22 is a view equivalent to FIGS. 7 to 12 of a third embodiment of a balloon according to the invention.

FIG. 23 is a view equivalent to FIGS. 7 to 12 of a third embodiment of a balloon according to the invention.

FIG. 24 is a view equivalent to FIGS. 7 to 12 of a third embodiment of a balloon according to the invention.

FIG. 25 is a view equivalent to FIGS. 7 to 12 of a fourth embodiment of a balloon according to the invention.

FIG. 26 is a view equivalent to FIGS. 7 to 12 of a fourth embodiment of a balloon according to the invention.

FIG. 27 is a view equivalent to FIGS. 7 to 12 of a fourth embodiment of a balloon according to the invention.

FIG. 28 is a view equivalent to FIGS. 7 to 12 of a fourth embodiment of a balloon according to the invention.

FIG. 29 is a view equivalent to FIGS. 7 to 12 of a fourth embodiment of a balloon according to the invention.

FIG. 30 is a view equivalent to FIGS. 7 to 12 of a fourth embodiment of a balloon according to the invention.

FIG. 31 is a view equivalent to FIGS. 7 to 12 of a fifth embodiment of a balloon according to the invention.

FIG. 32 is a view equivalent to FIGS. 7 to 12 of a fifth embodiment of a balloon according to the invention.

FIG. 33 is a view equivalent to FIGS. 7 to 12 of a fifth embodiment of a balloon according to the invention.

FIG. 34 is a view equivalent to FIGS. 7 to 12 of a fifth embodiment of a balloon according to the invention.

FIG. 35 is a view equivalent to FIGS. 7 to 12 of a fifth embodiment of a balloon according to the invention.

FIG. 36 is a view equivalent to FIGS. 7 to 12 of a fifth embodiment of a balloon according to the invention.

DETAILED DESCRIPTION OF PREFERRED EMBODIMENTS OF THE INVENTION

Figure 1:
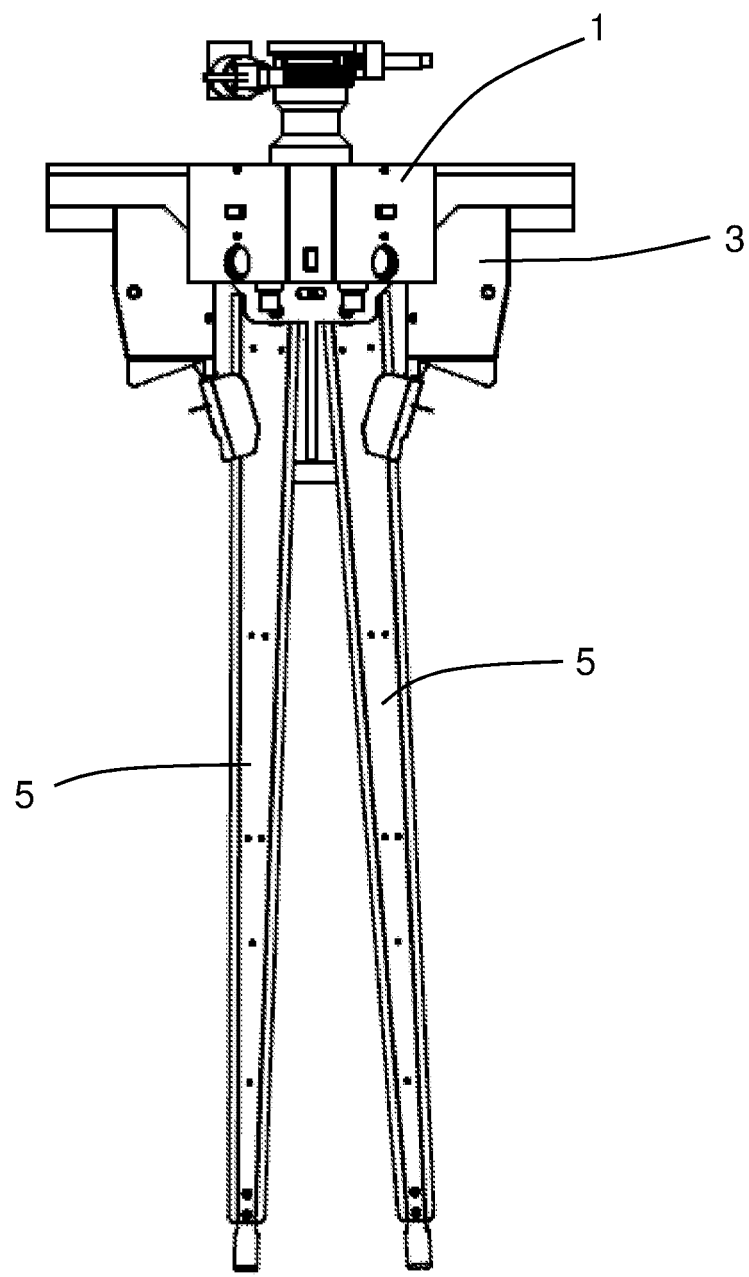
FIG. 1 is a front elevation view of a mannequin according to the invention, in a closed position.
Figure 2:
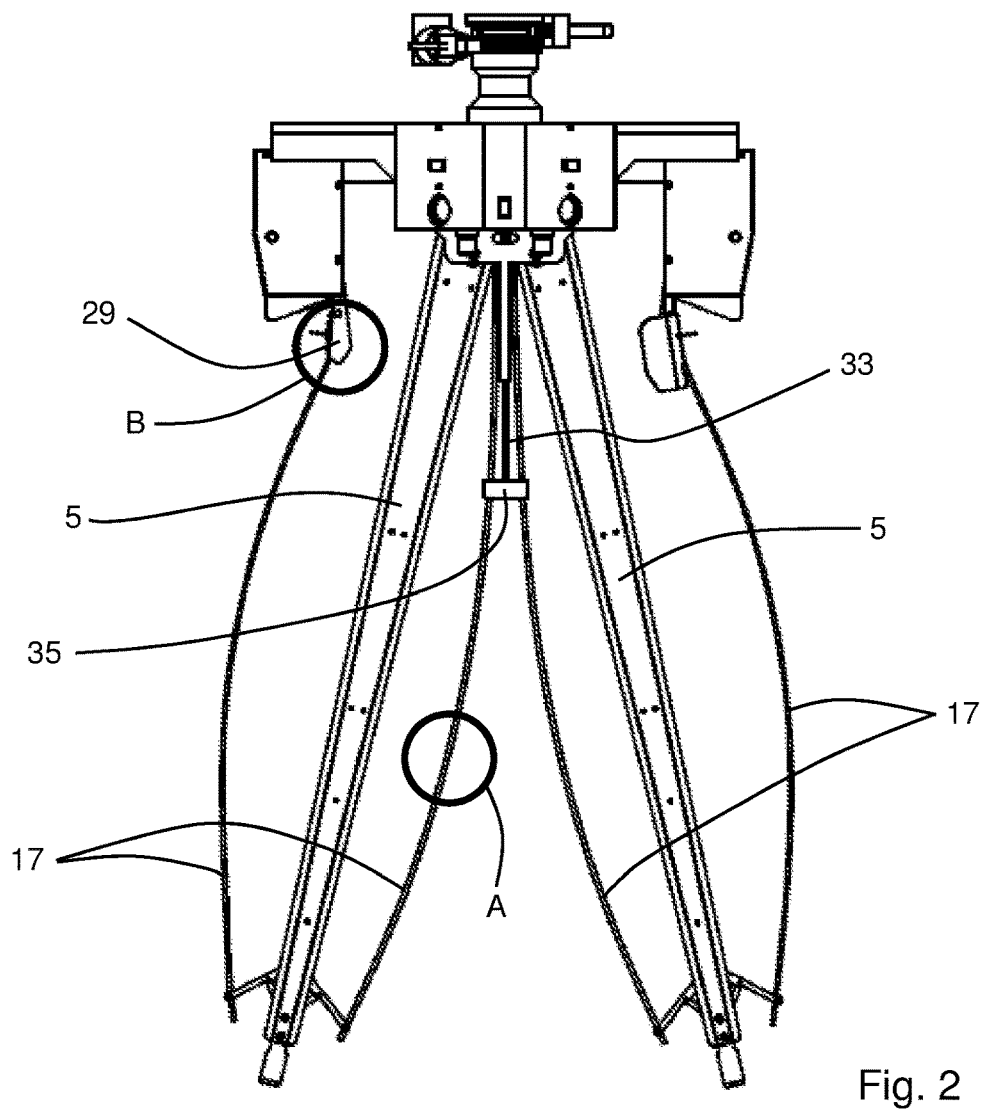
FIG. 2, a front elevation view of the mannequin of FIG. 1 in the open position.
Figure 3:
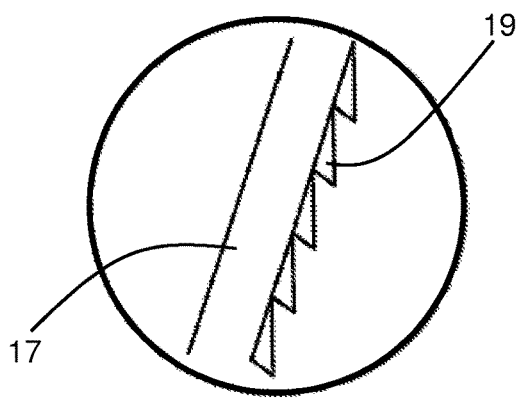
FIG. 3, an enlargement of zone A of FIG. 2.
Figure 4:
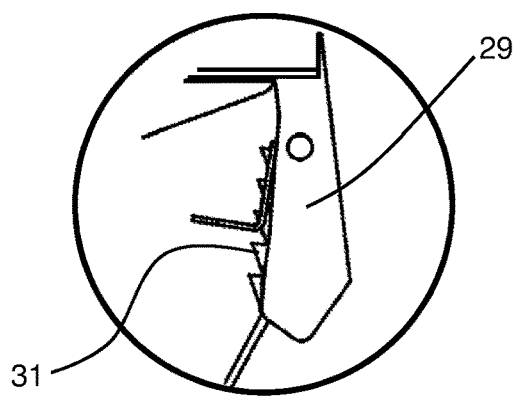
FIG. 4, an enlargement of zone B of FIG. 2.
Figure 5:
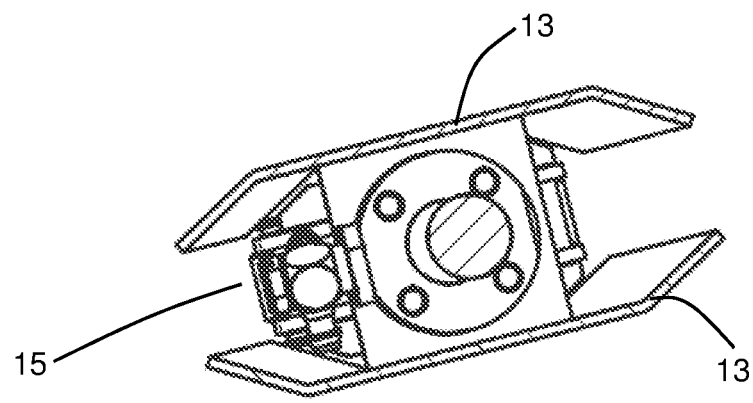
FIG. 5 is a perspective cross-sectional view of a leg of the mannequin of FIG. 1.
Figure 6:
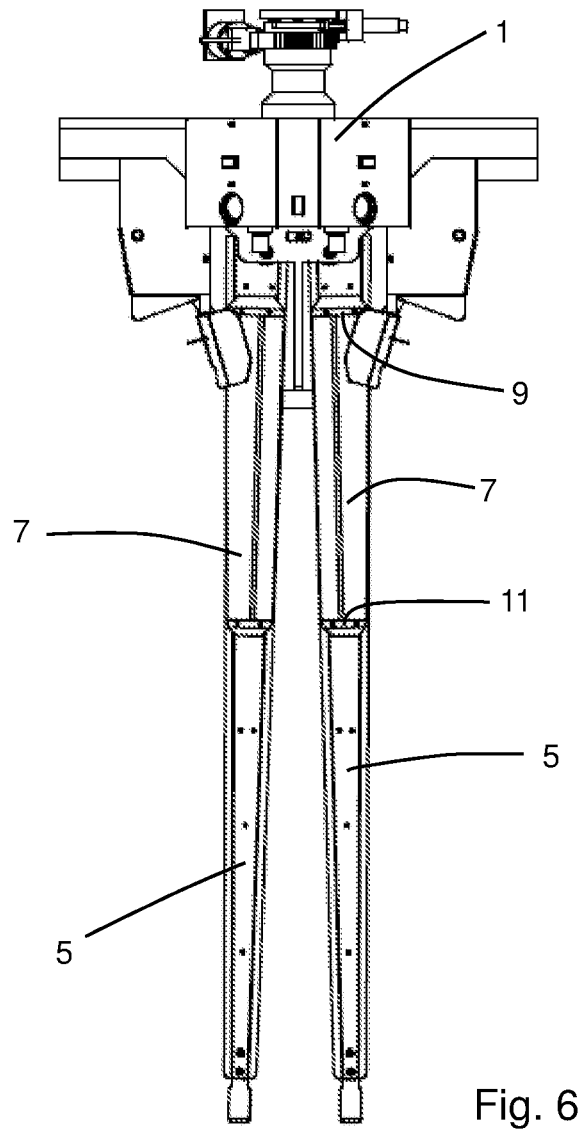
FIG. 6, a rear elevation view of the mannequin of FIG. 1.

FIGS. 1 to 6 show a mannequin according to the invention. The mannequin comprises an upper support structure 1 with a fixing area 3 of the upper part of a pair of pants. The mannequin has two legs 5 that will be housed each of them in one of the legs of the pants. Each leg 5 has a balloon 7 fixed at its rear part (see FIG. 6), namely at the upper part of the leg 5. Each balloon 7 is fixed to the corresponding leg 5 by its upper edge 9 and its lower edge 11.

Each leg 5 is formed by two metal plates 13, one of which conforms the front part of the leg 5 and the other conforming the rear part of the leg 5 and, each of them having a flat central section. Between the two plates 13 is a hollow space 15.

The mannequin has a drive mechanism that allows switching from a closed position to an open position and vice versa. In the open position, the legs 5 are opened and outer and inner extending rods 17 are projected to the sides stretching the pants sideways. The rods 17 have a toothed surface 19 that prevents the pant legs from sliding upwards. When the mannequin is in the closed position, the rods 17 are housed within the hollow space 15.

Figures 40, 41:
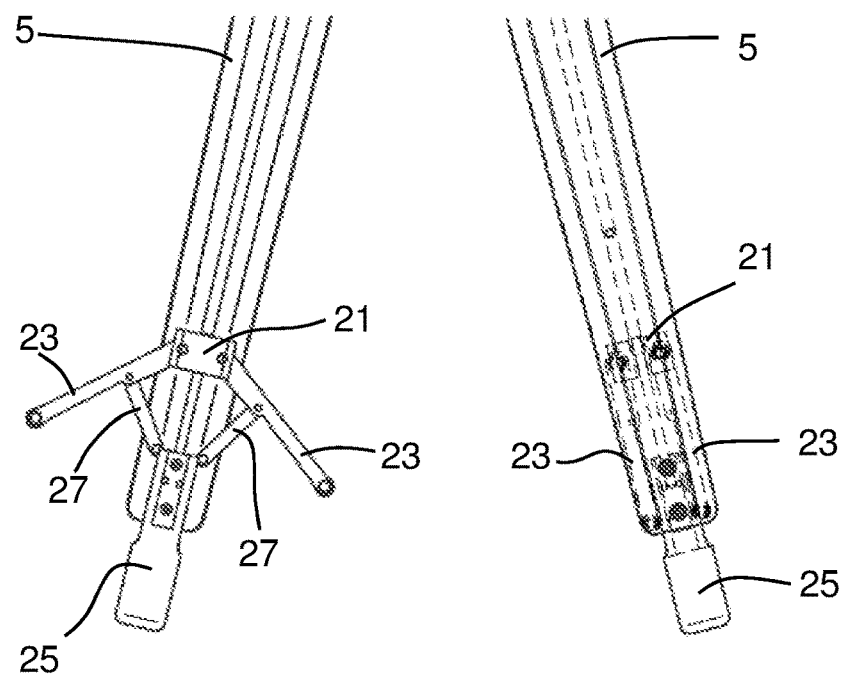
FIG. 40 is a front elevation views of a rod detachment mechanism according to the invention.
FIG. 41 is another front elevation view of a rod detachment mechanism according to the invention.

The rods 17 have their lower end connected to a deploying mechanism (see FIGS. 40 and 41), comprising a movable guide 21, two attached deploying arms 23, able to rotate, connected to the movable guide 21 by one of its ends, a support 25 attached to the drive mechanism of the mannequin and rods 27, attached at one end to the support 25 and at another end to an intermediate point of the corresponding deployment arm 23. The support 25 is arranged below the movable guide 21. The drive mechanism moves the movable guide 21 downwards (when the mannequin is in the open position) or upwards (when the mannequin is placed in the closed position) causing the deployment or withdrawal of the deploying arms 23, respectively. The deploying mechanism is also housed within the hollow space 15.

In the fixing area 3 there is a pant waist support area 29, which also has a toothed surface 31 that prevents the pants from sliding downwards.

Figure 42:
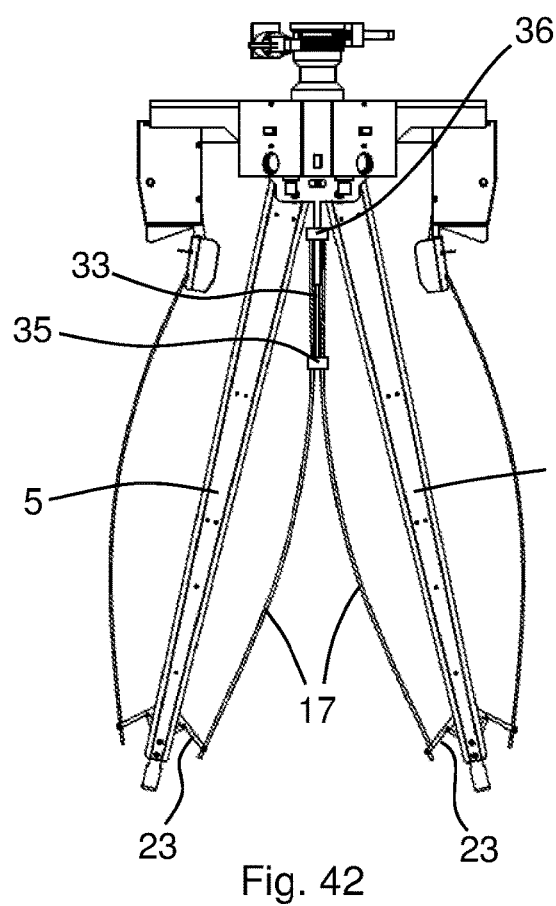
FIG. 42 is a front elevation view of a mannequin in the open position with a pant crotch adjustment system according to the invention in a different positions.
Figure 43:
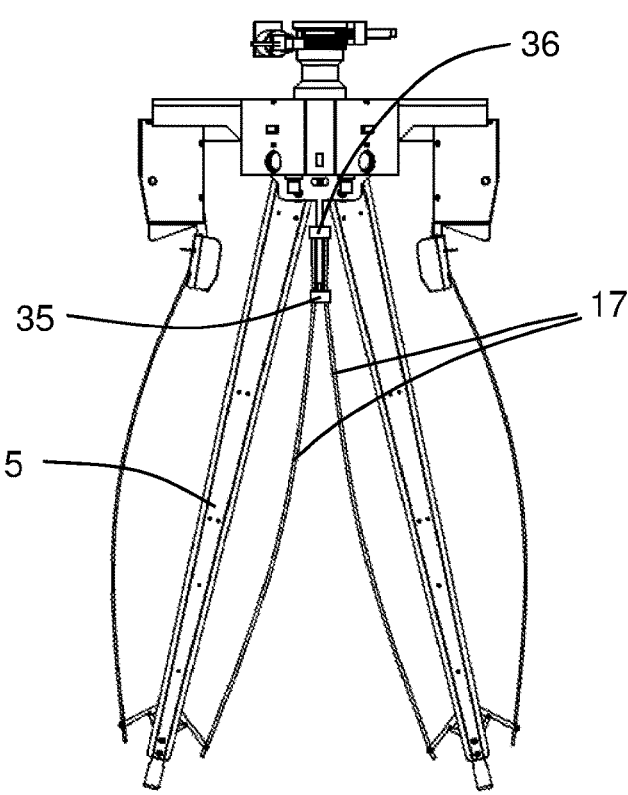
FIG. 43 is another front elevation view of a mannequin in the open position with a pant crotch adjustment system according to the invention in a different position.

In the area corresponding to the cross of the pant there is a pant crotch adjustment system (see FIGS. 42 and 43) comprising a height adjustment bar 33 and a cross guide 35. The cross guide 35 has two through holes, each of which is traversed by one of the inner rods 17 of each of the legs 5. The inner rods 17 have their lower end fixed to the free end of the corresponding deploying arm 23 and its upper end fixed to a fixing point 36. When varying the length of the height adjustment bar 33 (varying its length), the cross guide 35 slides along the rods 17 and guides them through the through holes, so that the rods 17 always come together at the cross guide 35. In this way the position of the inner rods 17 can be adjusted to pants with different crotch without it being necessary to make any adjustment on the inner rods 17 themselves, since by simply changing the height of the cross guide 35 the inner rods 17 are already forced, thanks to an elastic deformation thereof, to adopt the necessary shape to the crotch of each trouser. In addition, by varying the position of the cross guide 35, the curvature of the inner rods 17 is modified, increasing it by lowering the cross guide 35 and decreasing it by raising the cross guide 35, thus achieving the optimum tension in the inner rods 17 for all kinds of sizes and shapes. The total length of the inner rods 17 does not vary and their attachment points are the same for any pant crotch.

FIGS. 7 to 12 show two balloons 7, for the left leg 5 and the right leg 5 of the mannequin. In general, each balloon 7 has an upper edge 9, a lower edge 11, an inner lateral section 37 with an inner edge 39 and an outer lateral section 41 with an outer edge 43. Each balloon 7 has a longitudinal axis 45 passing through its geometric center and is parallel to the longitudinal axis of the corresponding leg 5. In the embodiment shown in FIGS. 7 to 12, each balloon 7 has a single folding line 47 relative to which the outer lateral section 41 has been folded inwards. The folding line 47 is arranged such that the outer lateral section 41 covers the area corresponding to the longitudinal axis 45. The balloon 7 of the right leg 5 is symmetrical about the balloon 7 of the left leg. Each balloon 7, unfolded, has a rectangular shape.

FIGS. 13 to 18 show another embodiment of the balloons 7. In this case, both the outer lateral section 41 and the inner lateral section 37 are folded inwards about a folding line 47. The two lateral sections are equally long, so as to reach the longitudinal axis 45, but without covering it.

In the embodiment of FIGS. 19 to 24, the outer lateral section 41 of each balloon 7 is folded around two folding lines: an inner folding line 49 and an outer folding line 51, so as to form a zigzag. In this example the folded outer lateral section 41 also does not cover the longitudinal axis 45.

FIGS. 25-30 show balloons 7 having both the outer lateral section 41 and the inner lateral section 37 folded around an inner folding line 49 and an outer folding line 51.

The balloons 7 of the embodiment of FIGS. 31 to 36 have a sealing section 53. The lateral sections are folded by two inner 49 and outer 51 folding lines, such that the outer lateral section 41 covers the sealing section 53 and the inner lateral section 37 does not cover it. The two balloons 7 are not identical to each other but symmetrical with each other.

Figures 37, 38:
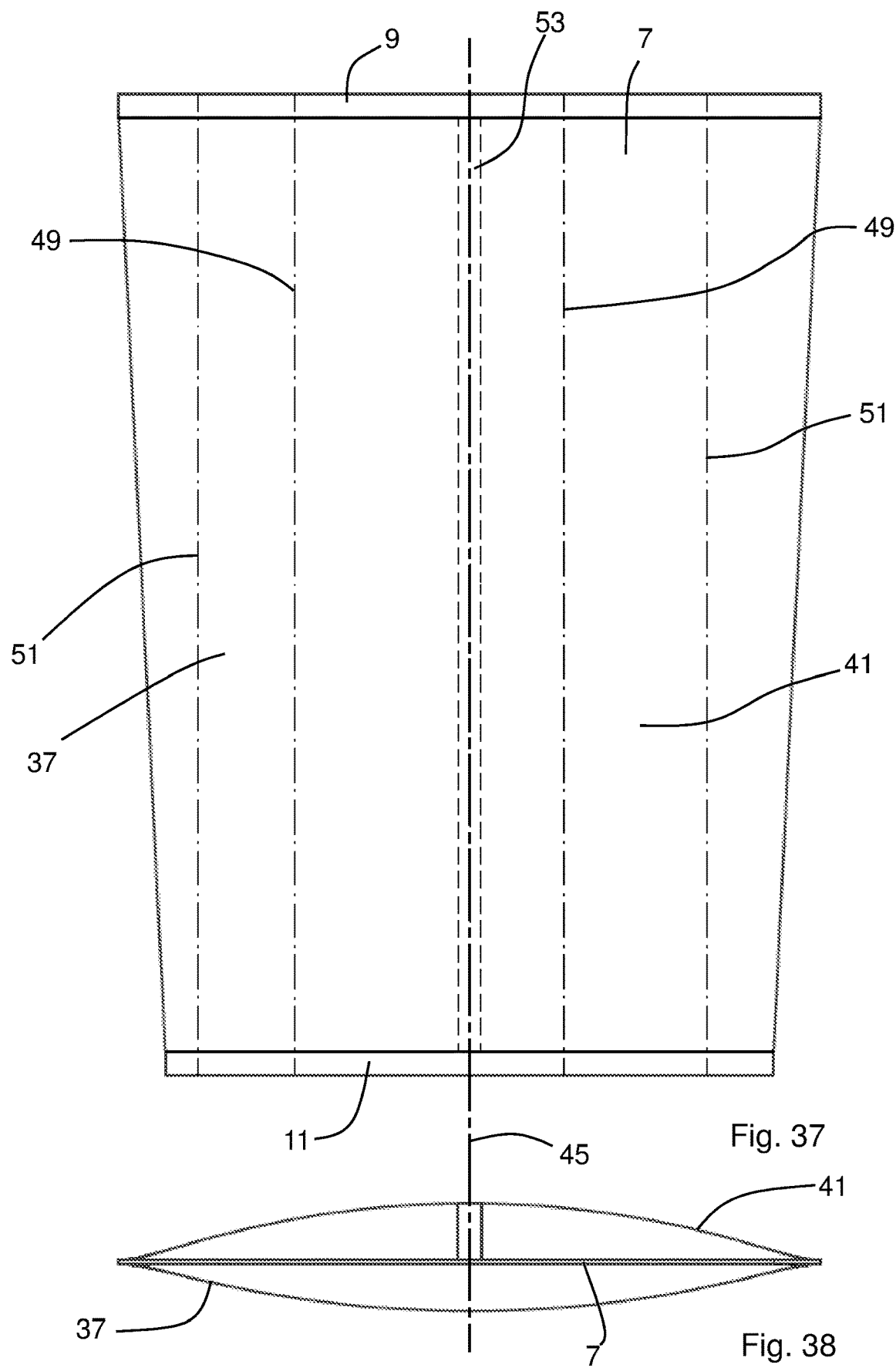
FIG. 37 is an elevation view of a balloon according to the invention, deployed.
FIG. 38 is a plan view of a balloon according to the invention, deployed.

FIGS. 37 and 38 show another embodiment of a balloon 7, corresponding to the right leg 5. It has a trapezoidal shape, so that its upper edge 9 is longer than its lower edge 11. It has a sealing section 53 coincident with the longitudinal axis 45 and, it further has two other sealing sections that close the upper edge 9 and the lower edge 11 of the balloon 7. It has inner folding lines 49 and outer folding lines 51 for both outer 41 and inner 37 lateral sections, arranged such that, once folded, the outer lateral section 41 will cover the sealing section 53.

Figure 39:
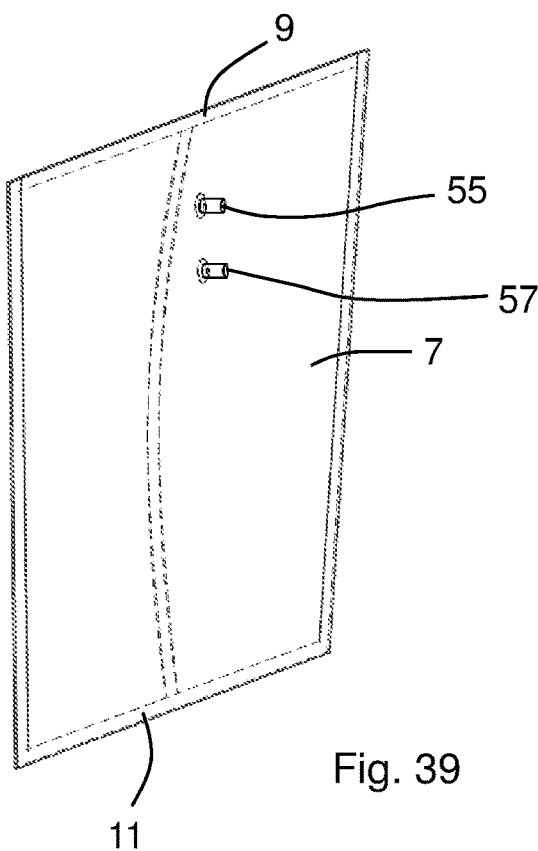
FIG. 39, a rear perspective view of a balloon according to the invention.

FIG. 39 shows a balloon 7 having an air inlet valve 55 and an air outlet valve 57 arranged on the rear face of the balloon 7, i.e. the face facing the rear surface of the leg 5. This arrangement allows the air passageways to be housed within the hollow space 15 of the leg 5, allowing a particularly flat design of the leg 5 as a whole. Additional inlet and outlet valves can be added to increase the swelling and deflation rate and/or to monitor the pressure inside the balloon.

Figure 44:
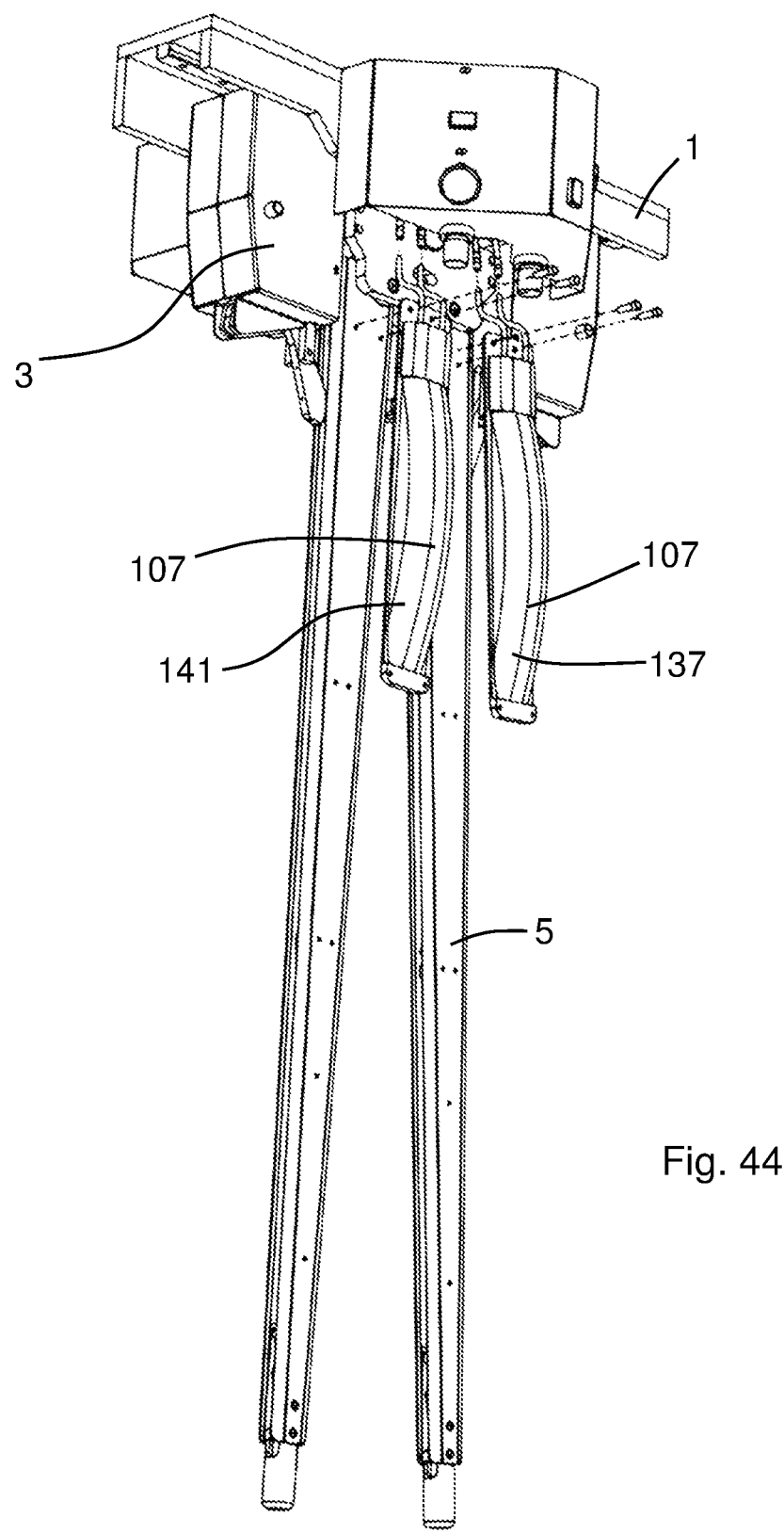
FIG. 44, a front perspective view of a mannequin with inflatable balloons arranged at its front part.

FIG. 44 shows a mannequin having a second inflatable balloon 107 at the front part of each of its legs 5. Each of the second inflatable balloons 107 has an upper edge, a lower edge, an inner lateral section 137 with an inner edge, proximal to the other leg 5, and an outer lateral section 141 with an outer edge, opposite the inner lateral section 137. In the example shown in this FIG., the second balloons 107 are equal to the balloons 7 of FIGS. 37 and 38 even though, as already indicated above, this needs not be so.

Figure 45:
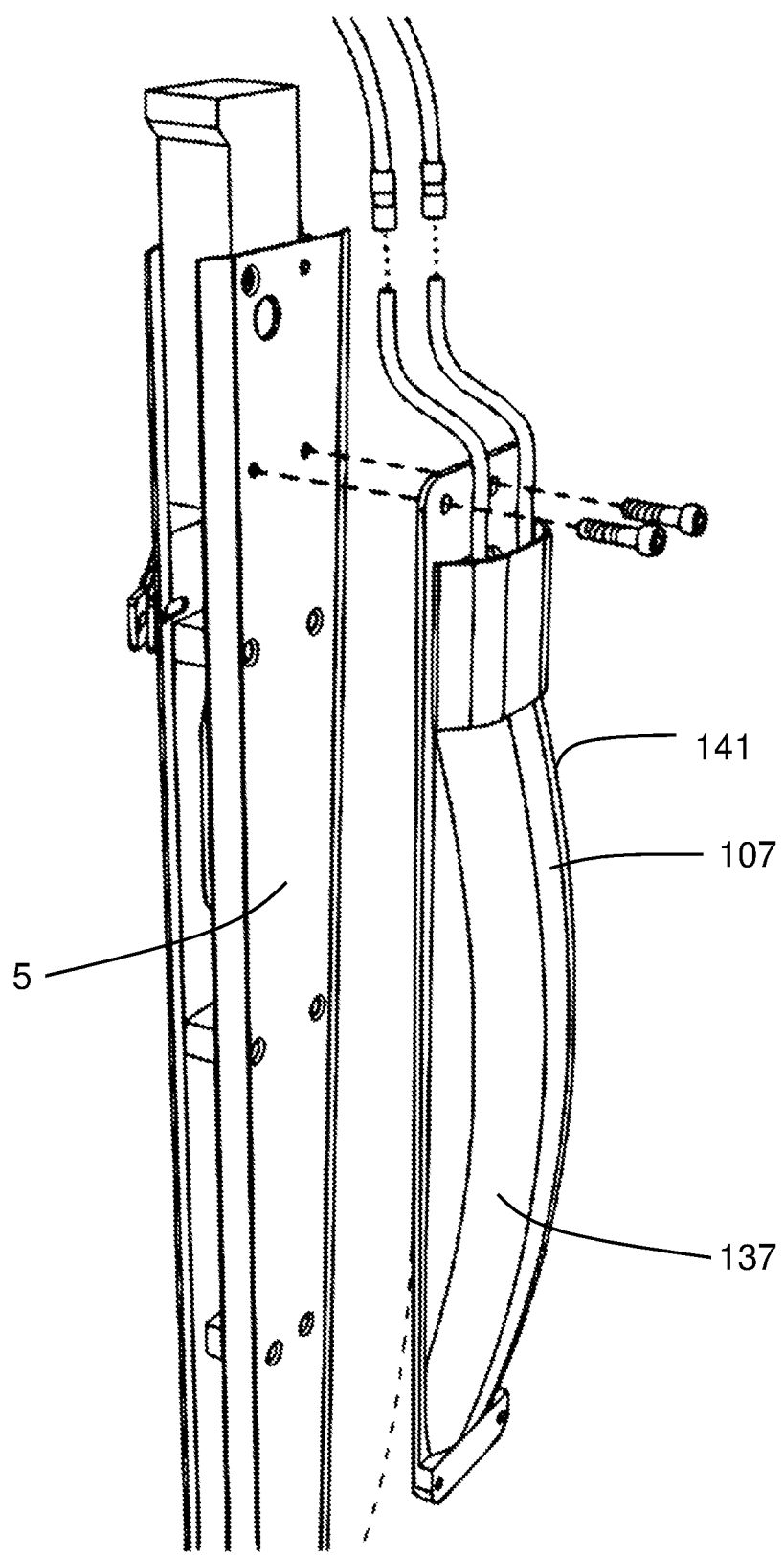
FIG. 45 is an enlarged partial view of the mannequin of FIG. 44.
Figure 48:
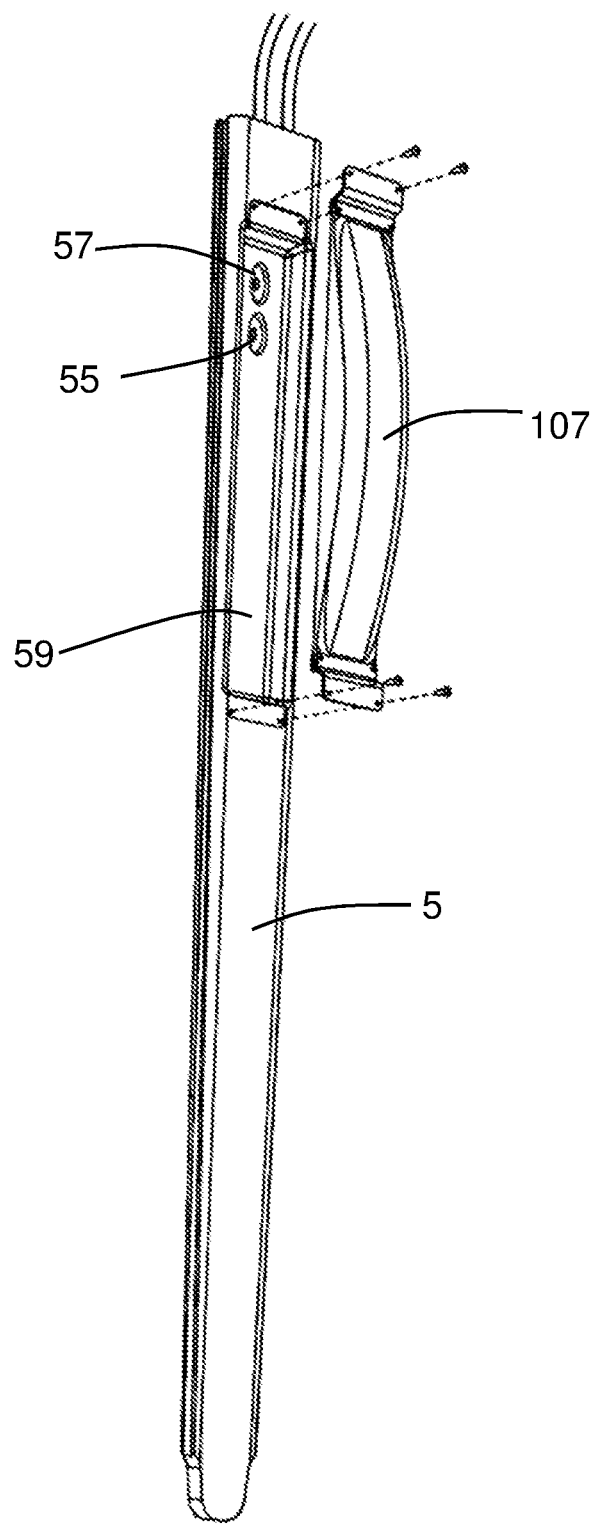
FIG. 48, a front perspective view of a leg with a seat for an inflatable balloon.
Figure 50:
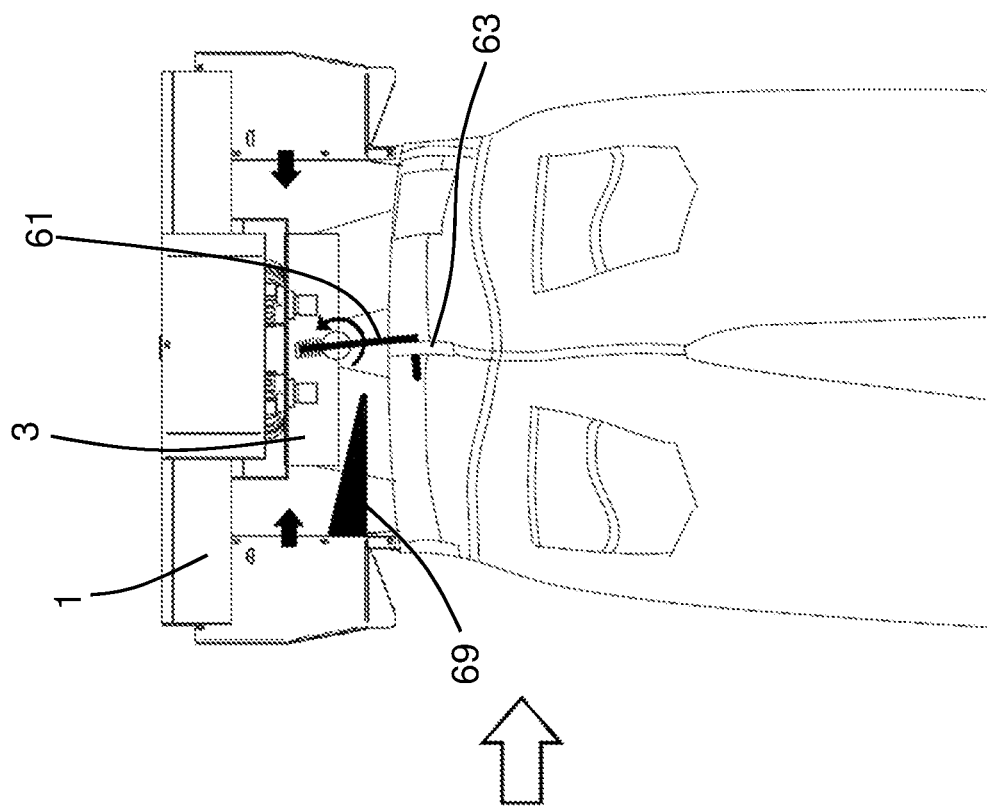
FIG. 50 is a partial rear elevation view of a mannequin with a hook for hooking pants through one of its belt loops.
Figure 49:
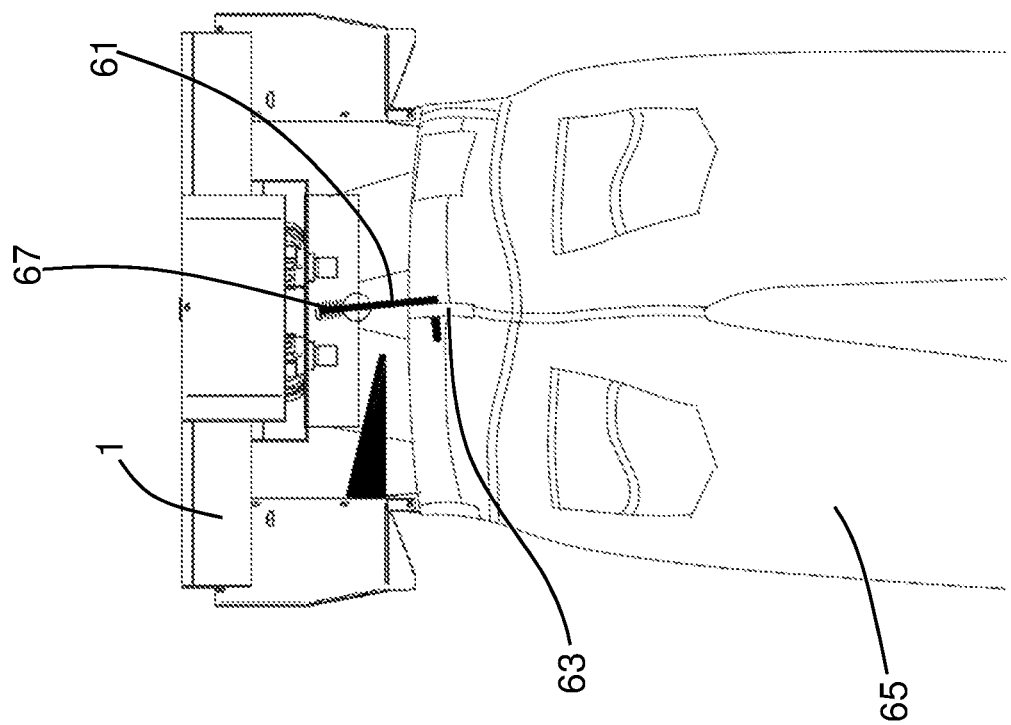
FIG. 49 is a partial rear elevation view of a mannequin with a hook for hooking pants through one of its belt loops.
Figure 52:
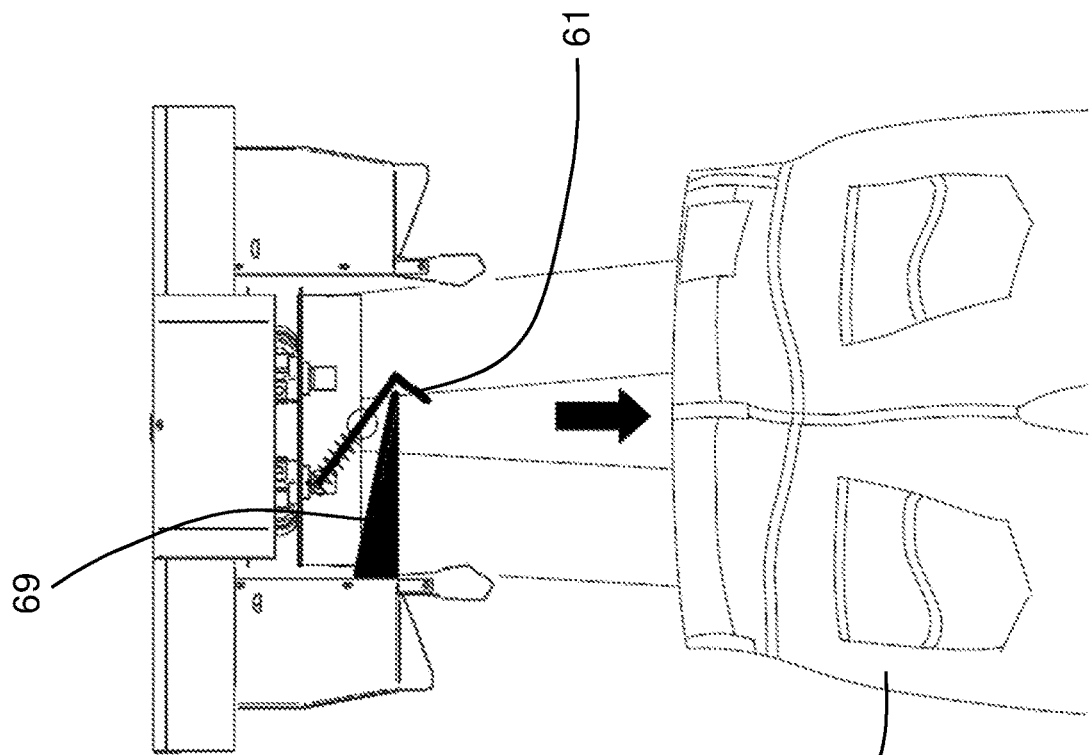
FIG. 52 is a partial rear elevation view of a mannequin with a hook for hooking pants through one of its belt loops.
Figure 51:
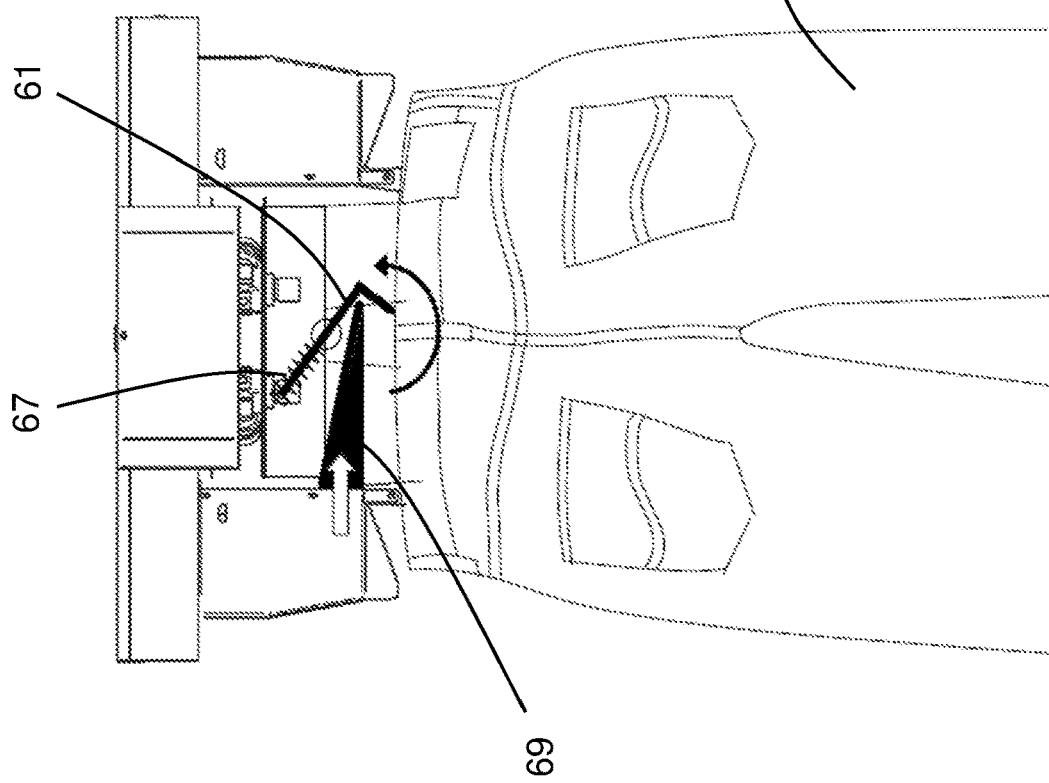
FIG. 51 is a partial rear elevation view of a mannequin with a hook for hooking pants through one of its belt loops.

The second balloon 107 on the leg 5 is shown in more detail in FIG. 45. The second balloon 107 is pre-mounted (already in a prestressed position) on a support, which is screwed onto the leg 5. In this way a very fast assembly and disassembly of the second balloon 107 is achieved with respect to the leg 5. In FIG. 48 shows a mounting alternative, wherein the leg 5 includes a housing 59. In this way, the second balloon 107, deflated, does not protrude compared to what would be the leg 5 without the mounted balloon, thus facilitating the removal of the treated pants. These solutions can also be applied to the balloons 7 arranged in the rear part of the leg 5.

Figure 46:
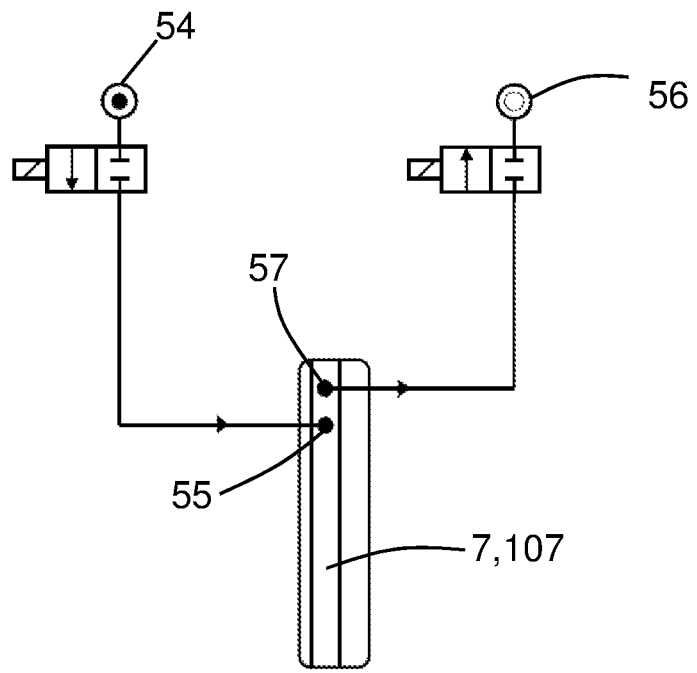
FIG. 46, a schematic of a pneumatic circuit of the mannequin.
Figure 47:
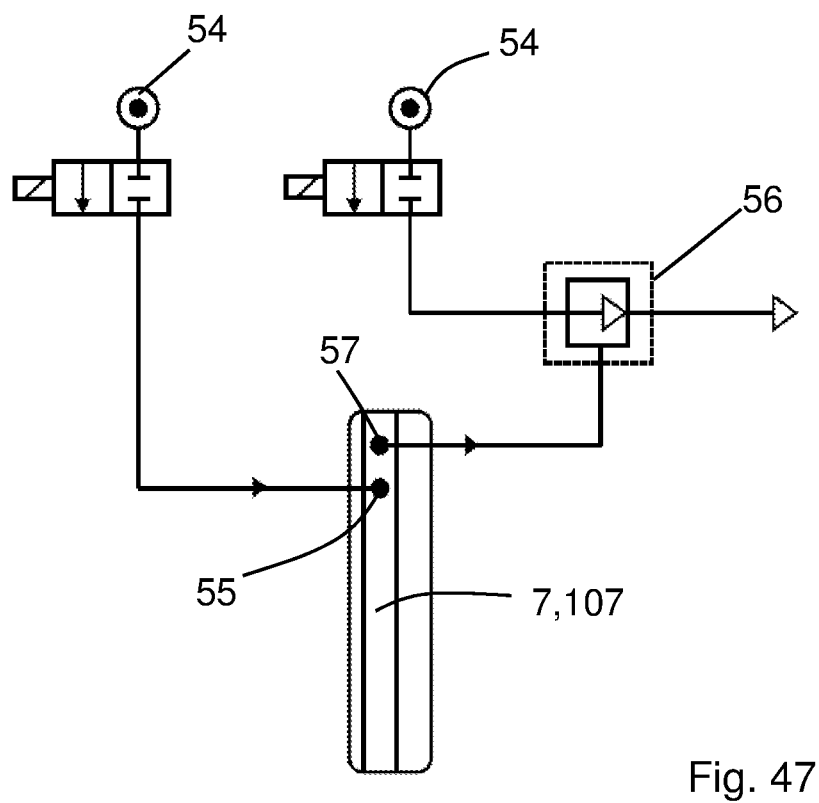
FIG. 47, a schematic of an alternative pneumatic circuit of the mannequin.

FIGS. 46 and 47 are schematic drawings of pneumatic installations for a mannequin according to the invention including depression generating means 56 connected to the outlet of the outlet valve 57 of a balloon 7, 107. FIG. 46 shows an installation with pressure generation means 54, for example, from a conventional air pressurizing system with a compressor and a compressed air tank that is connected to the inlet valve 55 of the balloon 7, 107. A control valve allows opening or closing of the passage of the compressed air from the tank to the balloon 7, 107. The depression generating means comprises a vacuum pump and a vacuum tank connected to the outlet valve 57 of the balloon 7, 107. A control valve allows the opening or closing of the passage to the vacuum tank. FIG. 47 shows an alternative installation in which venturi effect generating means (for example a venturi valve) is used as depression generation means 56. The venturi valve is connected to pressure generating means 54. In this way the air flow necessary to create the venturi depression can be generated, by means of which the air contained in the balloons 7, 107 can be sucked.

FIGS. 49-52 show a mannequin comprising a hook 61 disposed at the rear part of the fixing area 3. The hook can rotate between an engaging position (see FIGS. 49 and 50), wherein the free end of said hook 61 is arranged below a belt loop 63 of the pants 65, and a release position (see FIGS. 51 and 52), wherein the free end of the hook 61 is remote from the belt loop 63. Some elastic means 67 pull up the free end of the hook 61 when in the engaging position. After the treatment of the pants has been completed, a lever 69 moves the hook from the engaging position to the release position (see FIG. 51), leaving the pants 65 releasable from the mannequin, for example thanks to the force of gravity.

The invention claimed is:

1. A mannequin for the surface treatment of pants, comprising:
an upper support structure, with a fixing area of an upper part of a pair of pants, and from which two legs configured to lodge inside the legs of said pants extend, wherein each leg defines a longitudinal axis, wherein said mannequin has a front part, corresponding to front part of the pants, and a rear part, wherein each of said legs has an inflatable balloon arranged at its rear part, each inflatable balloon has
an upper edge,
a lower edge,
an inner lateral section with an inner edge proximal to another leg, and
an outer lateral section with an outer edge, opposite the inner lateral section, each inflatable balloon has a longitudinal axis which passes through its geometric center and is parallel to the longitudinal axis of the corresponding leg, each inflatable balloons has its outer lateral section folded upon itself at least once around a folding line extending from said upper edge to said lower edge, said upper edge is fixed to a rear upper end of the corresponding leg, such that a part of the upper edge corresponding to the outer lateral section is also fixed to the rear upper end of the leg, said lower edge is fixed to a rear intermediate point of the corresponding leg, such that a part of the lower edge corresponding to the outer lateral section is also fixed to said rear intermediate point.

2. The mannequin according to claim 1, wherein each inflatable balloons has its outer lateral section folded upon itself at least twice around an inner folding line and an outer folding line both extending from said upper edge to said lower edge, such that the outer lateral section is folded in a zigzag fashion, said upper edge is fixed to the rear upper end of the corresponding leg, such that the part of the upper edge corresponding to the outer lateral section is also fixed to the rear upper end of the leg, said lower edge is fixed to the rear intermediate point of the corresponding leg, such that the part of the lower edge corresponding to the outer lateral section is also fixed to said rear intermediate point.

3. Mannequin according to claim 2, wherein the inner folding line and the outer folding line of the outer lateral section are arranged such that the folded outer lateral section covers the longitudinal axis of each inflatable balloon.

4. The mannequin according to claim 1, wherein said rear intermediate point is arranged within a range of between 25% and 75% of the total length of the corresponding leg, measured from the rear upper end of the leg.

5. The mannequin according to claim 1, wherein the mannequin has a plurality of intermediate points.

6. The mannequin according to claim 1, wherein each inflatable balloons has its inner lateral section folded upon itself at least once around a third folding line extending from said upper edge to said lower edge, said upper edge is fixed to the rear upper end of the corresponding leg, such that the part of the upper edge corresponding to the inner lateral section is also fixed to the rear upper end of the leg, said lower edge is fixed to the rear intermediate point of the corresponding leg, such that that part of the lower edge corresponding to the inner lateral section is also fixed to said rear intermediate point.

7. The mannequin according to claim 6, wherein each of said inflatable balloons has its inner lateral section folded upon itself at least twice around an inner folding line and an outer folding line both extending from said upper edge to said lower edge, so that the inner lateral section is folded in a zigzag fashion, said upper edge is fixed to the rear upper end of the corresponding leg, such that the part of the upper edge corresponding to the inner lateral section is also fixed to the rear upper end of the leg, said lower edge is fixed to the rear intermediate point of the corresponding leg, such that the part of the lower edge corresponding to the inner lateral section is also fixed to said rear intermediate point.

8. The mannequin according to claim 1, wherein each inflatable balloon has a sealing section extending from said upper edge to said lower edge.

9. The mannequin according to claim 8, wherein the sealing section extends along the longitudinal axis of each inflatable balloon.

10. The mannequin according to claim 8, wherein an inner folding line and an outer folding line of the outer lateral section are arranged such that the folded outer lateral section covers the sealing section.

11. The mannequin according to claim 1, wherein each inflatable balloon is fixed to the corresponding leg in a state of longitudinal pre-tension.

12. The mannequin according to claim 1, wherein each inflatable balloons, folded and deflated, has a width equal to or less than a width of the leg on which it is mounted, so that each inflatable balloon does not protrude laterally with respect to the leg on which it is mounted.

13. The mannequin according to claim 1, wherein each leg comprises a flat front face and a flat rear face and a hollow space therebetween wherein an outer rod and an inner rod are housed, wherein the lower ends of said outer and inner rods are attached to a deploying mechanism of the outer and inner rods.

14. The mannequin according to claim 13, wherein said deploying mechanism comprises: a movable guide, two deploying arms, each having a hingedly attached end to said movable guide and a free end, a support, wherein said support is arranged below said movable guide, wherein said movable guide is configured to move between a deploying position, in which it is closest to the support, and a folding position, in which it is further away from the support, two connecting rods, each with an end hingedly connected to the rear intermediate point of the corresponding deploying arm and the other end connected to the support, wherein, in both the folded and the deployed position, the free end of each deploying arm is below the end attached to the movable guide, so that, when deployed, each of the deploying arms has an inverted V-shape.

15. The mannequin according to claim 13, wherein at least one of said rods has a toothed surface which prevents the pants from sliding upwards.

16. The mannequin according to claim 1, wherein said upper support structure further comprises:
a pant waist support area, wherein said pant waist support area has a toothed surface which prevents the pants from sliding down.

17. The mannequin according to claim 13, further comprising:
a pant crotch adjustment system which in turn comprises:
a height adjustment bar, a cross guide having two longitudinal through holes, each of which houses one of the inner rods of one of the legs therein.

18. The mannequin according to claim 1, wherein each of said legs has a second inflatable balloon arranged at its front part, wherein said second inflatable balloon has an upper edge, a lower edge, an inner lateral section with an inner edge, proximal to the other leg, and an outer lateral section with an outer edge, opposite the inner lateral portion, wherein said second inflatable balloon has a longitudinal axis passing through its geometric center and is parallel to the longitudinal axis of the corresponding leg.

19. The mannequin according to claim 18, wherein each second inflatable balloons has its outer lateral section folded upon itself at least once around a third folding line extending from said upper edge until said lower edge, said upper edge is fixed to a front upper end of the corresponding leg, such that the part of the upper edge corresponding to the outer lateral section is also fixed to the rear upper end of the leg, said lower edge is fixed to a front intermediate point of the corresponding leg, such that the part of the lower edge corresponding to the outer lateral section is also fixed to said front intermediate point.

20. The mannequin according to claim 18, wherein each inflatable balloons is equal in size to the inflatable balloon of the corresponding leg.

21. The mannequin according to claim 18, further comprising:
a pressure generating means configured to supply a different swelling pressure to each inflatable balloon.

22. The mannequin according to claim 1, further comprising:
a depression generating means connected to an outlet of an outlet valve of each inflatable balloon.

23. The mannequin according claim 22, wherein said depression generating means is a means for generating a venturi effect.

24. The mannequin according to claim 1, wherein each inflatable balloon has two outlet valves.

25. The mannequin according to claim 1, wherein each of said legs has a housing in its front part configured to receive a deflated balloon therein.

26. The mannequin according to claim 1, wherein each of said legs has a housing in its rear part configured to receive a deflated balloon therein.

27. The mannequin according to claim 1, further comprising:
a hook arranged at the rear part of said fixing area, configured to rotate between an engaging position, wherein a free end of said hook is arranged below a belt loop of said pants, and a disengagement position, wherein the free end of said hook is remote from said belt loop.

28. The mannequin according to claim 27, further comprising:
an elastic means configured to move said free end of said hook upwards when in said engaging position.

29. The mannequin according to claim 27, further comprising:
a lever configured to move said hook from said engaging position to said disengaging position.

30. The mannequin according to claim 1, further comprising:
a hook arranged in a front part of said fixing area, configured to rotate between an engaging position, in which a free end of said hook is arranged below a closure button of the fly of said pants, and a disengagement position, wherein the free end of said hook is remote from said closure button.

* * * * *